July 26, 1938. W. DOLGOFF 2,124,610
SUBMERSIBLE MOTOR
Filed June 3, 1936 2 Sheets-Sheet 2

Inventor
Wladimir Dolgoff
by Robt Meyer
attorney.

Patented July 26, 1938

2,124,610

UNITED STATES PATENT OFFICE 2,124,610

SUBMERSIBLE MOTOR

Wladimir Dolgoff, Paris, France

Application June 3, 1936, Serial No. 83,372
In Germany June 5, 1935

1 Claim. (Cl. 171—252)

In submerged electric motors, such for example as motors for actuating pumps for deep wells, it is essential to protect the winding of the stator against infiltrations of liquid.

Several methods have already been proposed; they consist in arranging in each slot of the stator a tube which receives the corresponding winding and which, at each of its ends is connected, either with a plate covering the whole of the stator and itself receiving a cover fitting over the whole of the end connections of the winding, or with an arcuate tube which connects it with the tube engaged in the corresponding slot, and receives the corresponding end connection.

These various methods are relatively complicated since it is necessary to manufacture beforehand all the tubes for the slots, to mount them in said slots in the desired position, and then to connect them to the flanges and the covers which are to envelop the end connections. All this work cannot be done accurately, the joints are sometimes badly made and there is a consequent lack of watertightness which is particularly harmful in this kind of motor.

The present invention overcomes these drawbacks and relates to a method of manufacturing the protecting coverings of the stator windings, said coverings being formed of a tubular system flanged at both ends, according to which method said system is formed inside the stator, said method being essentially characterized by the fact that the system formed by the tubes and the two flanges is obtained by moulding or directly injecting, without any preliminary transformation, into the stator, a plastic material such as bakelite which, in solidifying, is brought to the desired final shape of the tubular envelope which is thus obtained in a single piece in a single operation.

Thus in a single particularly simple operation the assembly of the tubes and the two end flanges is obtained.

Other characteristics and peculiarities of the invention will become apparent from the ensuing description taken in conjunction with the accompanying drawings in which.

Figure 1:
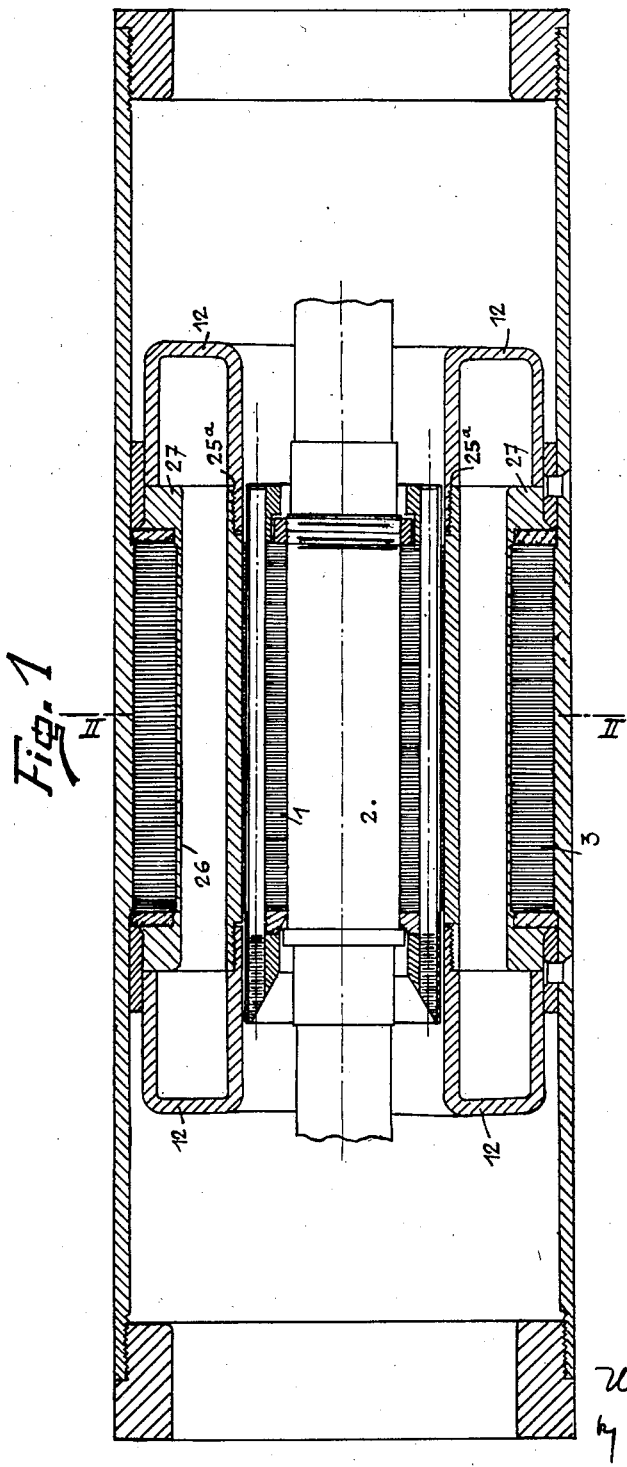
Fig. 1 is a longitudinal section through an electric motor of the submerged type illustrating in section the water-tight closures for the stator windings.
Figure 2:
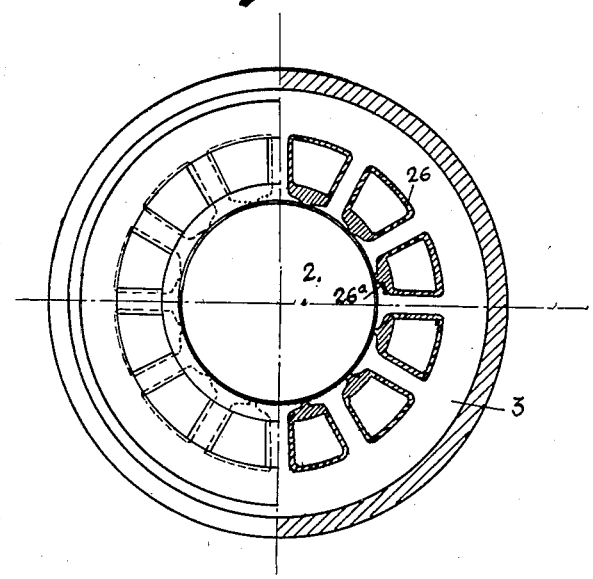
Fig. 2 is a cross sectional view, the right hand half-section being taken along the line II—II of Fig. 1.

In Fig. 1 is shown a section of a submerged electric motor comprising, in the usual manner, a rotor 1 secured to a shaft 2 and which rotates within a stator 3. Said stator consists, as usual, in the juxtaposition of slotted plates, the general shape of which is shown in Fig. 2. The assembly of said plates therefore forms the stator slots extending downwardly across the stator, and through which the windings of the stator are to be passed.

It is essential that in motors of this kind, which have to operate when they are immersed in a liquid, the stator windings should be protected against infiltrations of liquid. The present invention concerns a process of manufacture enabling an integral protecting covering to be formed in the motor itself. According to the invention, a plastic material which can, for example, be bakelite, is run or injected directly into the stator slots and on the surfaces of the stator.

Figure 3:
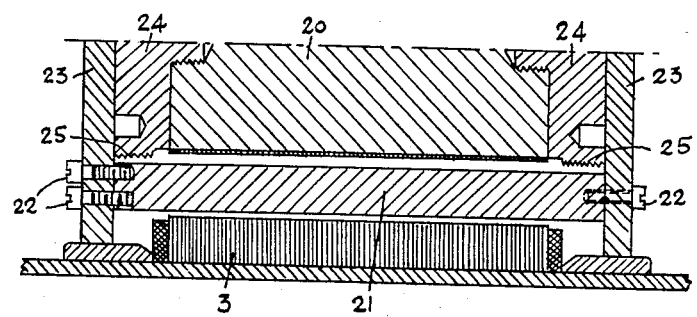
Fig. 3 is a half longitudinal section of the jig device enabling the casting operation to be effected for obtaining the protection, according to Figs. 1 and 2.

The invention can be carried out by means of any suitable jig, enabling this casting or injection of plastic material to be obtained under suitable conditions. For example, the arrangement shown in Fig. 3 can be adopted. A core 20 is placed in the central bore of the stator and in each stator slot is placed a core 21, the position and dimensions of said cores being calculated so that, when the plastic material is poured in or injected, tubes are obtained having walls of the desired size. The cores 21 can, for example, be held in the correct position by screws 22, carried by end plates 23. Cores 24 having in particular screw threads 25 are screwed onto the central core.

The plastic material is then poured or injected into the free spaces remaining, through the various above mentioned cores. The plates 23 and the cores 20, 21 and 24 are then withdrawn, and the system of tubes and flanges shown in Figs. 1 and 2 is then obtained. In each slot there is formed, in particular, a bakelite tube 26 and the system of said tubes is secured at each end to a flange 27. It will immediately be realized that this tubular system ensures a complete protection of the winding chamber which, in the usual manner, is completed on each side by a cover 12. The threads 25 of the cores 24 referred to above, enable threads 25a to be obtained, on which can be screwed any appropriate member of the electric motor.

As appears more particularly from Figs. 1 and 2 the wall of the bakelite tubes thus formed in each slot is of greater thickness on the rotor side, as seen at 26a, Fig. 2. This is an appreciable advantage, since it is on this side that the risks of infiltration are the greatest, and that the water-tightness should be the most effective, which is the case owing to this extra thickness.

Thus, according to the invention, a motor is obtained in which the windings of the stator are effectively protected against infiltrations of water which cannot occur owing to the long path which such water would have to follow along the tubes to reach the winding chamber.

It is moreover obvious that the invention has only been described and shown herein in a purely explanatory and in no way limitative manner and that modifications of detail could be made therein without altering its scope.

I claim:

A liquid type closure for the stator windings of submersible electric motors having stators with slots therein, comprising a plurality of individual tubes of insulating material extending through said slots and having their ends joined by inner and outer annular flanges formed integrally with the tubes, said inner annular flanges having threads thereon, and end covers for receiving the end connections of the motor screw-threadably connected to said threaded portions of said inner flanges.

WLADIMIR DOLGOFF.